United States Patent [19]

Rickard

[11] Patent Number: 5,437,496
[45] Date of Patent: Aug. 1, 1995

[54] SEATING SYSTEM FOR A MOBILE CHAIR

[76] Inventor: Lori Rickard, 143 Jasper Pl., Alexandria, Va. 22304-4905

[21] Appl. No.: 153,908

[22] Filed: Nov. 17, 1993

[51] Int. Cl.$^6$ .............................................. A47C 7/42
[52] U.S. Cl. ..................................... 297/283.2; 5/465; 297/423.3; 297/440.2; 297/452.48
[58] Field of Search ...................... 297/130, 283, 284.1, 297/354.12, 354.13, 423.3, 440.1, 440.20, 440.22, 452.48; 5/465, 620, 632, 633, 653

[56] References Cited

U.S. PATENT DOCUMENTS

| | | | |
|---|---|---|---|
| 2,617,469 | 11/1952 | Skok | 297/423.3 X |
| 2,674,745 | 4/1954 | Burke Sr. | 5/465 X |
| 4,763,951 | 8/1988 | Silverman | 297/452.28 X |
| 4,824,169 | 4/1989 | Jarrell | 297/284.1 |
| 5,342,114 | 8/1994 | Burke et al. | 297/354.13 X |

FOREIGN PATENT DOCUMENTS

92/14387  9/1992  WIPO .......................... 297/440.22

Primary Examiner—Peter R. Brown
Attorney, Agent, or Firm—Rogers & Killeen

[57] ABSTRACT

A baby stroller having plural sets of replaceable cushions, where each set of cushions has a preformed contour that conforms to the shape of a chair occupant of a different height. One set of cushions may be replaced with a set having a different preformed contour as the size of the chair occupant changes. The adjoining edges of the cushions are overlapping to avoid the formation of a gap between the cushions. The chair may be collapsible, and the cushions may be joined so that the chair is substantially flat when collapsed.

19 Claims, 3 Drawing Sheets

SEATING SYSTEM FOR A MOBILE CHAIR

BACKGROUND OF THE INVENTION

The present invention relates to chairs with replaceable sets of cushions that are preformed to conform to various sized occupants, and more particularly to collapsible baby carriages that have such cushion sets and that lie substantially flat when collapsed.

Collapsible baby carriages of various types are well known. Typically, the carriages include a seat section carried by a frame that may be collapsed. In some carriages, the seat section is a padded rigid structure that provides appropriate support for the child's body in the carriage (e.g., a mattress). However, such carriages cannot be collapsed so that the carriage may be flat for easy storage and handling. In other collapsible carriages, the seat section is less rigid (e.g., a cloth sling stretched across the frame such as in "umbrella" strollers) and the carriage can be collapsed so that it is flat for easy storage and handling. However, in these carriages the seat section provides improper or negligible support for the child's body. This problem is particularly acute where the seat is a cloth sling because an infant's body may be bent and doubled over in a carriage that is too large, while a larger child may contact an uncomfortable frame section in a carriage that is too small.

It is believed that the best support for a child's body (or for an invalid in a wheelchair) is provided by a seat that is contoured to match the size of the occupant. Contoured seats generally have a preformed backing that is cushioned. However, the preformed contours do not change size as the size of the child changes. For example, a carriage having contours that match the size of an infant will not be appropriate for a two or three year old, and vice versa.

Carriages having separate preformed and contoured seat sections may present the further problem of gaps between the sections that may provide additional discomfort or may pinch an occupant when the angular relationship between the seat sections is changed (e.g., when a back section is lowered so that a child may sleep more comfortably).

As is apparent, these same problems may arise in wheelchairs for physically disadvantaged individuals, especially for children that may outgrow a wheelchair, or may not sit comfortably in a wheelchair that is too large.

It is therefore an object of the present invention to provide a novel collapsible mobile chair that provides good body support for the occupant and that obviates the problems of the prior art.

It is a further object of the present invention to provide a novel mobile chair having replaceable sets of cushions, each set having different sized contours therein to conform to different sized occupants.

It is an additional object of the present invention to provide a novel mobile chair having replaceable sets of cushions that overlap so that no substantial gaps are created between adjacent cushions when the angular relationship between the cushion changes.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
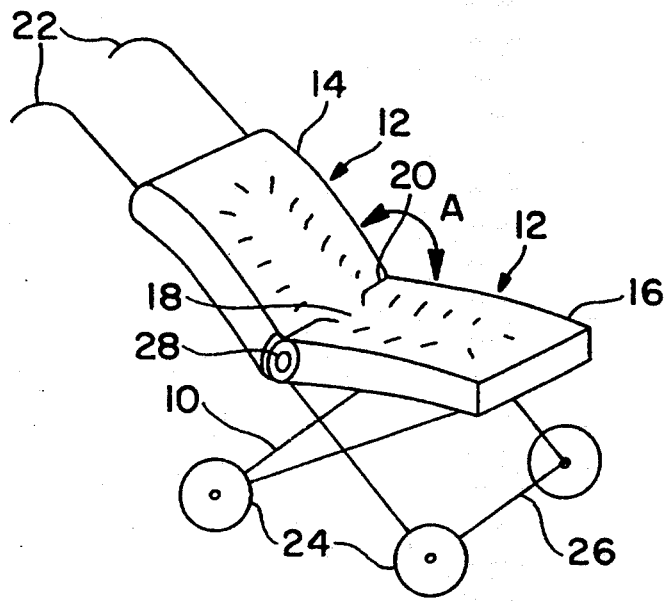
FIG. 1 is a pictorial depiction of a mobile chair of the present invention.

With reference now to FIG. 1, the mobile chair of the present invention may include a conventional collapsible frame 10 and two or more sets of removably attachable cushions 12, each set having a preformed back cushion 14 and a preformed seat cushion 16 that are contoured 18 to conform to the torso of an occupant of a predetermined height. Each set of cushions 12 is contoured to conform to the torso of an occupant of a different height. The edges 20 of adjoining cushions overlap so that no substantial gap exists between cushions 14 and 16 when the angular relationship A between the cushion changes.

Figure 2:
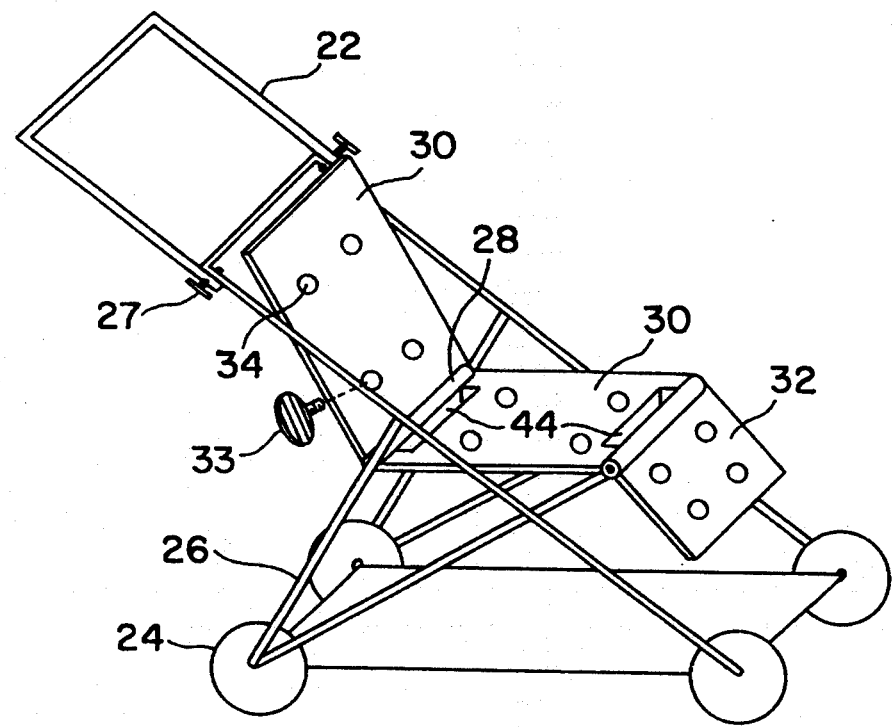
FIG. 2 is a pictorial view of a collapsible frame that can be used to support a set of cushions of the present invention.

With reference to FIGS. 1 and 2, the frame 10 may have any conventional structure with a handle 22, wheels 24 and a body 26 that may be collapsed so that it lies substantially flat. A device for adjusting the angular relationship A between the cushions 14 and 16 may be provided. Such frames are well known and within the skill of the artisan. The handle 22 may be hingedly attached to the body 26 with hand-operated nuts 27 to allow the handle to fold onto the body 26 for more convenient storage. The body 26 may have a cross piece 28 extending substantially the width of the cushions at the edge 20. The body 26 may include planar members 30 (FIG. 2) that may provide additional support for the cushions. A legrest 32 may also be provided. The cushions may be removably attached with wing nuts, thumb screws or other conventional, hand-operated attachment devices 33 through holes 34 in the body 26 and/or in the planar members 30. As will be discussed below, some of the attachment devices 33 may be eliminated in the event one of the cushions 14 and 16 is hingedly attached to the cross piece 28.

Figures 3A, 3B, 3C:
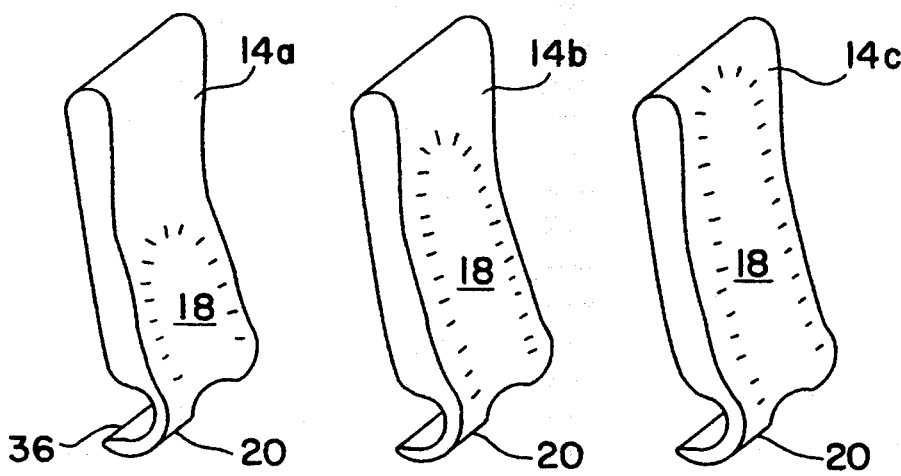
FIG. 3A-3C are pictorial views of three back cushions illustrating different contour sizes that may be found in a cushion set of the present invention.

With reference now to FIGS. 3A, 3B, and 3C, back cushions 14a-14c from a set of cushions 12 may have different sized contours 18 formed in the front surface thereof to accommodate different sized chair occupants. If the back cushions are used in a chair for a growing child, back cushion 14a may be used first, and replaced with back cushions 14b and 14c as the child grows. Corresponding contours would be formed in seat cushions 16.

The edge 20 of one of the cushions 14 and 16 may be adapted to fit onto the cross piece 28 of the frame 10 so the cushion can rotate around the cross piece 28 when the angular relationship A changes. For example, the edge 20 may have a C-shaped opening 36 that fits over or snaps onto the cross piece 28. This embodiment may replace some of the cushion attachment devices 33, or may be used when the cushion with the opening 36 moves relative to parts of the frame 10 and cannot be otherwise attached thereto.

Figure 4:
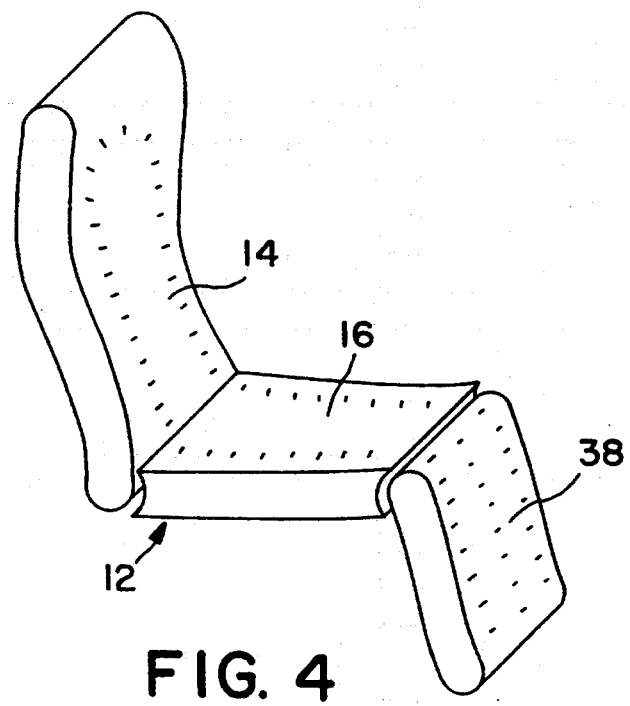
FIG. 4 is a pictorial depiction of a set of cushions of the present invention that includes a leg cushion.
Figure 5:
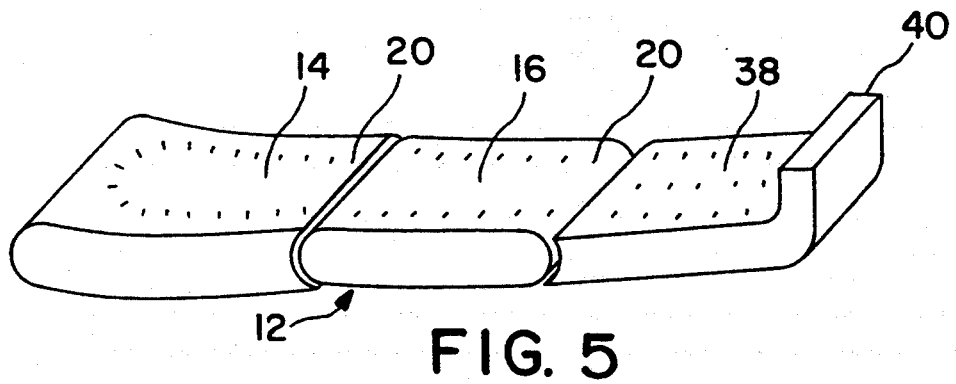
FIG. 5 is a pictorial depiction of a set of cushions of the present invention in a substantially flat arrangement.

With reference now to FIGS. 4 and 5, the cushion set 12 of the present invention may also include a leg cushion 38 that may include a foot support 40. The edges 20 of adjoining cushions 14, 16 and 38 may be convex and concave so that adjacent cushions overlap, and so that no substantial gaps are created between cushions (i.e., so that there is no gap between the cushions large enough for a body part to get caught or pinched). The overlapping concave edge can also be used with the C-shaped opening 36 discussed above. As illustrated in FIG. 5, the convex/concave edges 20 allow the cushions in set 12 to be placed in various angular relationships (including substantially flat as shown) without substantial gaps between cushions, thus obviating the problem of pinching the occupant when changing the angular relationship. The concave/convex edges 20 also allow the cushion set to be made flat for easier storage.

Figure 6:
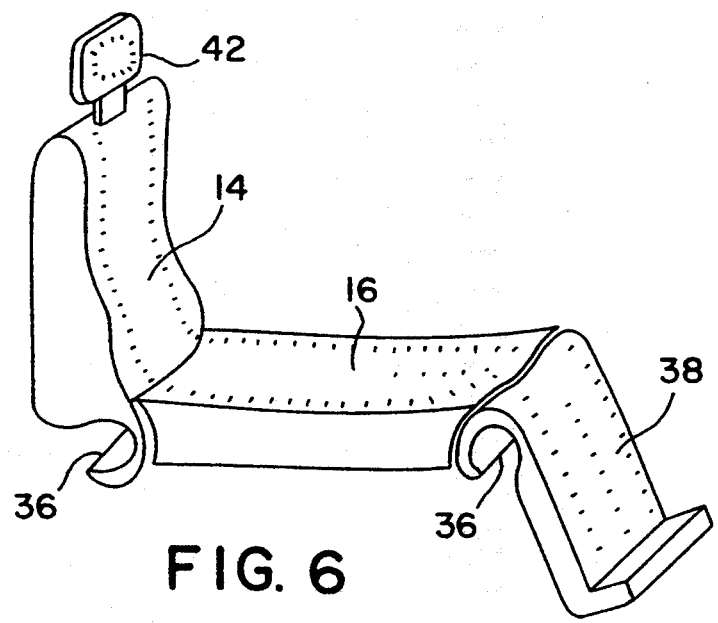
FIG. 6 is pictorial depiction of a further embodiment of the present invention.

In alternative embodiments, and with reference to FIG. 6, a headrest 42 may be provided to accommodate occupants larger than the largest cushion set 12. The leg cushion 38 may also have a C-shaped opening 36 that fits onto a corresponding cross piece in the frame 10 to obviate the need for the attachment devices 33. With reference once again to FIG. 2, the C-shaped opening 36 may fit into openings 44 in the planar members 30.

In yet another embodiment of the present invention, the cushions, in addition to having different sized contours in the face thereof, may also have different lengths and different widths to further accommodate different sized chair occupants.

Figure 7:
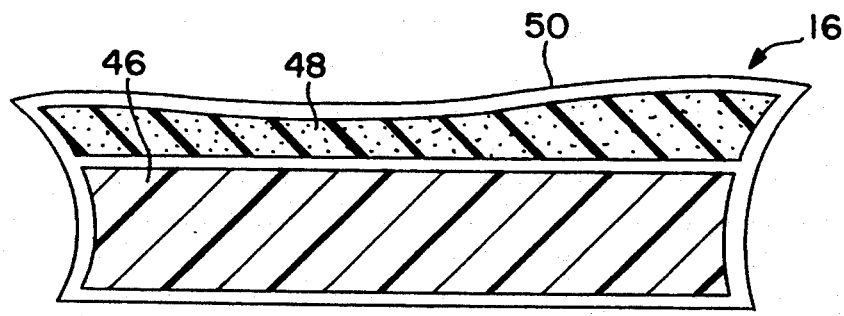
FIG. 7 is cross-sectional view of a seat cushion of the present invention.

With reference to FIG. 7, the cushions of the present invention may have a hard plastic backing 46 that is provided with the appropriate contours overlain with a layer of foam rubber 48 and covered with a water resistant washable material 50. Alternately, the cushions may be provided with a thin backing overlain with contoured foam rubber, and covered by a water resistant washable material.

Figure 8:
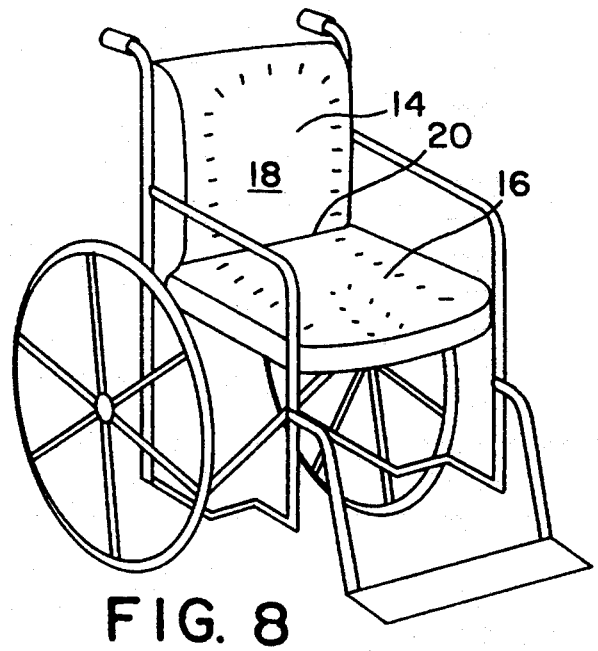
FIG. 8 is a pictorial depiction of a wheelchair of the present invention.

With reference to FIG. 8, the present invention also will find application in a wheelchair that accommodates different sized occupants. Such a wheelchair would be particularly useful for a handicapped child since the back cushion 14 and seat cushion 16 could be replaced as the handicapped child grows. This would ensure the child always remains comfortable in the wheelchair and would eliminate the need to replace one sized wheelchair with another.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A collapsible mobile chair with replaceable cushions comprising:
    a collapsible frame with wheels and a cross bar extending across a width of the chair;
    a first set of generally planar back and seat cushions with a preformed depression therein that conforms to the torso of a chair occupant of a first predetermined height;
    a second set of generally planar back and seat cushions with a preformed depression therein that conforms to the torso of a chair occupant of a second predetermined height larger than said first predetermined height;
    each of said cushions having means for removable attachment to said frame;
    each of said set of cushions having adjoining edges that overlap so that no substantial gap exists therebetween when the chair is not collapsed, and so that each said set of cushions is substantially coplanar when the chair is collapsed; and
    at least one of said back and seat cushions of each of said sets of cushions having a hook-shaped member at said adjoining edge that mates with said cross bar when said set of cushions is attached to said frame.

2. The chair of claim 1 wherein each said set of cushions further comprises a leg rest having means for attachment to said frame, wherein said leg rest and said seat cushion have adjoining edges that overlap so that no substantial gap exists therebetween when the chair is not collapsed.

3. The chair of claim 2 wherein each said leg rest has a depression therein for the legs of a chair occupant.

4. The chair of claim 1 wherein said frame comprises means to adjust the angular relationship between said back and seat cushions when the frame is not collapsed.

5. The chair of claim 1 wherein said adjoining edges that overlap comprise;
    an edge having a concavity that overlies said hook-shaped member.

6. The chair of claim 5 wherein each of said first and second set of cushions further comprises a leg rest, and wherein each said leg rest and each said seat cushion have adjoining edges that comprise a first edge having a hooked-shaped member that mates with a second cross bar of said frame, and a second cross bar of said frame, and a second edge having a concavity that overlies said first edge hook-shaped member.

7. The chair of claim 1 wherein said means for removable attachment comprises plural thumb screws that extend through said frame and into said cushions.

8. The chair of claim 1 further comprising at least one additional set of generally planar back and seat cushions with a preformed depression therein that conforms to the torso of a chair occupant of a predetermined height larger than said second predetermined height.

9. The chair of claim 1 wherein each of said cushions comprises a rigid substrate overlain with a resiliently resistive padding.

10. A mobile chair with replaceable cushions comprising:
    a frame with wheels;
    a first set of generally planar back and seat cushions with a preformed depression therein that conforms to the torso of a chair occupant of a first predetermined height;
    a second set of generally planar back and seat cushions with a preformed depression therein that conforms to the torso of a chair occupant of a second predetermined height larger than said first predetermined height;
    each of said cushions having means for removable attachment to said frame;

each of said cushions having adjoining edges that comprise,
  a first edge having a C-shaped hook member for mating with a cross bar of said frame; and
  a second edge having a concavity that overlies said C-shaped member; and
means for adjusting the angular relationship between said back and seat cushions within a predetermined angular range,
whereby no substantial gap exists between said adjoining edges when said angular relationship is adjusted within said predetermined angular range.

11. The chair of claim 10 wherein each of said first and second set of cushions further comprises a leg rest cushion having means for attachment to said frame and having a depression therein for the legs of an occupant of said chair, and wherein each said leg rest and each said seat cushion have adjoining edges that comprise a first edge having a C-shaped hook member for mating with a further cross bar of said frame, and a second edge having a concavity that overlies said C-shaped member of said first edge of said leg rest and said set cushion, whereby no substantial gap exists between said leg rest cushion and said seat cushion when said angular relationship is adjusted within said predetermined angular range.

12. The chair of claim 11 wherein the chair is a baby carriage.

13. The chair of claim 11 wherein the chair is a wheelchair.

14. A chair having replaceable cushion elements comprising:
  a frame with a backrest support and a seat support for removable attachment of cushions;
  a first set of cushions comprising,
    a backrest with a front having a preformed contour that conforms to the upper torso of a chair occupant,
    a seat with a top having a preformed contour that conforms to the lower torso of a chair occupant,
    said backrest and said seat being adapted to be removably attached to respective ones of said backrest support and seat support, and
  one of said backrest and said seat having a hook-shaped member for hingedly mating with a cross bar of said frame when said first set of cushions is attached to said frame 15. The chair of claim 14 further comprising means to adjust the angular relationship between said backrest and said seat, and wherein said backrest is rotatable about said cross bar when the angular relationship between said backrest and said seat is adjusted.

16. The chair of claim 14 wherein said bracket and said seat each comprise a thin, contoured, hard plastic backing overlain by a layer of resiliently resistive rubber and covered with a water resistant material.

17. The chair of claim 15 wherein said backrest support and said seat support are for collapsing so that the chair may be folded generally coplanar.

18. The chair of claim 15 wherein said backrest and said seat have adjoining portions that overlap so that no substantial gap exists therebetween when said backrest and said seat are attached to respective ones of said backrest support and seat support.

19. The chair of claim 15 further comprising a second set of said cushions having preformed contours that conform to a chair occupant of a size different than the chair occupant to which said first set of cushions conform.

* * * * *